United States Patent
Duisenberg

(10) Patent No.: US 7,743,182 B2
(45) Date of Patent: Jun. 22, 2010

(54) METHOD AND APPARATUS FOR SYNCHRONIZING A SOFTWARE BUFFER INDEX WITH AN UNKNOWN HARDWARE BUFFER INDEX

(75) Inventor: Kenneth C. Duisenberg, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2120 days.

(21) Appl. No.: 10/072,358

(22) Filed: Feb. 6, 2002

(65) Prior Publication Data

US 2003/0149748 A1  Aug. 7, 2003

(51) Int. Cl.
*G06F 3/00* (2006.01)
*G06F 5/00* (2006.01)

(52) U.S. Cl. .............................. 710/52; 710/53; 710/54; 710/55; 710/56; 710/57

(58) Field of Classification Search ............... 710/1, 710/29, 48, 260, 52–57; 714/53
See application file for complete search history.

(56) References Cited

U.S. PATENT DOCUMENTS

| 4,637,023 | A | * | 1/1987 | Lounsbury et al. | 714/54 |
| 5,860,001 | A | * | 1/1999 | Cromer et al. | 713/1 |
| 6,134,607 | A | * | 10/2000 | Frink | 710/22 |
| 6,470,463 | B1 | * | 10/2002 | Chen et al. | 714/25 |

OTHER PUBLICATIONS

"Wikipedia: Device Driver", http://en.wikipedia.org/wiki/Device_driver.*
"Introduction to Computer Systems," May 3, 2001.*

* cited by examiner

*Primary Examiner*—Chun-Kuan Lee

(57) ABSTRACT

Method and apparatus for synchronizing a software buffer index with an unknown hardware buffer index. Specifically, a method of processing data is disclosed comprising synchronizing a software buffer index to a hardware buffer index. The method sequentially searches through a plurality of buffers containing data to find a second buffer with unprocessed data. The method is implemented when the software buffer index points to a first buffer containing processed data. Thereafter, the software buffer index is reset to the next available buffer having processed data following the second buffer.

24 Claims, 6 Drawing Sheets

METHOD AND APPARATUS FOR SYNCHRONIZING A SOFTWARE BUFFER INDEX WITH AN UNKNOWN HARDWARE BUFFER INDEX

TECHNICAL FIELD

The various embodiments of the present invention relate to a method of and apparatus for synchronizing a software buffer index with an unknown hardware buffer index.

BACKGROUND ART

Hardware for a local area network (LAN) service processor manages access to the physical LAN network on a particular electronic device. A corresponding LAN software driver works in conjunction with the LAN hardware to process the data stored in memory by the LAN hardware.

Both the LAN hardware and the LAN software have respective buffer indices that indicate which buffer in a ring of buffers the corresponding hardware or software will access. With normal data processing when the buffer indices are synchronized, the LAN software would receive an interrupt from the LAN hardware that a new LAN packet of data was received and ready for processing. The LAN software would check its buffer index and find the new data to process. In addition, when each of the LAN hardware and LAN software buffer indices reach the end of the ring of buffers, the indices are moved to the beginning of the ring to continue storing, accessing, and processing data.

Normally, the hardware LAN and the software LAN driver have synchronized buffer indices for storing and processing efficiency. However, the LAN hardware buffer index and the LAN software buffer index may become unsynchronized. For example, the LAN hardware on a service processor can start running before the LAN software driver is initialized. In that case, the LAN hardware could be receiving and storing LAN packets into a ring of buffers for memory. While the software LAN driver remains uninitialized, no processing of received data is done by the LAN software, and correspondingly the LAN software buffer index remains static. As a result, the hardware and the software buffer indices would be unsynchronized since the LAN hardware buffer index would be ahead of the LAN software buffer index.

In another case, the LAN hardware buffer index may advance without inputting data into a buffer. When the LAN software accesses the buffer for processing, that buffer would have been skipped by the LAN hardware without any storing of unprocessed data.

If the LAN hardware buffer index is not pointing to the same memory location as the LAN software buffer index when the LAN software receives an interrupt indicating a LAN packet containing data has been stored and is ready for processing, the LAN software will check the buffer indicated by its buffer index and discover that there is nothing new to process. In that case, the LAN software will wait without advancing its buffer index. Meanwhile, the LAN hardware will continue to receive incoming LAN packets of data and store them into succeeding buffers.

The LAN hardware and software buffer indices will continue to be unsynchronized until the LAN hardware buffer index has moved to the same location as the LAN software index. The LAN software buffer index would be synchronized with the LAN hardware buffer index until the LAN software buffer index reaches all the previously stored buffers in the ring still containing unprocessed data. At that point, the LAN software would process all the unprocessed data within a single time period, advancing the software index until reaching a buffer containing processed data. As such, the LAN software buffer index would again be out of synchronization with the LAN hardware buffer index.

Prior Art FIG. 1 is a flow diagram 100 illustrating the processing of data when the LAN hardware and software buffers are unsynchronized in one situation. Diagram 100 illustrates a ring of N buffers for storing data, including buffers 0, 1, 2, 3, on up to N. The upper portion of diagram 100 shows the flow of the LAN hardware buffer index in varying stages. The lower portion of diagram 100 shows the flow of the LAN software buffer index in the same varying stages. At stage 0, both the LAN hardware and software buffer indices are unsynchronized. The LAN hardware buffer index points at buffer 3 and the LAN software buffer index points at buffer 0. Buffers 0 and 3 contain processed data.

At stage 1, the LAN hardware receives a LAN packet. The LAN packet is stored into buffer 3 and the LAN hardware buffer index is advanced to point to buffer 4. The LAN hardware sends an interrupt to the LAN software. The LAN software checks the buffer, buffer 0, indicated by its buffer index and discovers processed data, and continues to wait. The LAN packet in buffer 3 remains unprocessed by the LAN software.

At stage 2, the LAN hardware receives another LAN packet. The LAN packet is stored into buffer 4 and the LAN hardware buffer index is advanced to point to the next buffer, buffer 5. The LAN hardware sends an interrupt to the LAN software. The LAN software checks the buffer, buffer 0, indicated by its buffer index and discovers processed data, and continues to wait. This continues buffer after buffer until the LAN hardware buffer index points to the last buffer in the ring of buffers, buffer N.

At stage 3, the LAN hardware receives another LAN packet. The LAN packet is stored into buffer N and the LAN hardware buffer index is advanced to point to buffer 0. The LAN hardware sends an interrupt to the LAN software. The LAN software checks the buffer, buffer 0, indicated by its buffer index and discovers processed data, and continues to wait.

In stage 4, the LAN hardware and software buffer indices become synchronized for a momentary period. In stage 4, the LAN hardware receives another LAN packet. The LAN packet is stored into buffer 0. The LAN hardware advances its buffer index to point to buffer 1. The LAN hardware sends an interrupt to the LAN software. The LAN software checks buffer 0, as indicated by its buffer index, and discovers unprocessed data. The LAN software processes the data in buffer 0, and advances its buffer index also to buffer 1. In addition, the LAN software checks to see if buffer 1 contains unprocessed data. If buffer 1 also contains unprocessed data, then the LAN software would process that data and continue to advance its buffer index, as discussed previously. In the example, buffer 1 contains processed data.

In stage 5, the LAN hardware and software indices remain synchronized. The LAN hardware receives another LAN packet. The LAN packet is stored into buffer 1. The LAN hardware sends an interrupt to the LAN software. The LAN hardware advances its buffer index to point to buffer 2. The LAN software checks buffer 1, as indicated by its buffer index, and discovers unprocessed data. The LAN software processes the data in buffer 1, and advances its buffer index also to buffer 2.

In stage 6, the LAN hardware and software indices become unsynchronized. The LAN hardware receives another LAN packet and stores the packet into buffer 2. The LAN hardware advances its buffer index to point to buffer 3. The LAN hardware sends an interrupt to the LAN software. The LAN software checks buffer 2, as indicated by its buffer index, and discovers unprocessed data. The LAN software processes the data in buffer 2, and advances its buffer index to buffer 3. As discussed previously, the LAN software discovers that buffer 3 contains unprocessed data and processes the data in buffer 3, continually advancing the LAN software buffer index until it processes all the previously stored LAN buffers, from buffer 3 to buffer N. At this point, the LAN software buffer index points to buffer 0 while the LAN hardware buffer index points to buffer 3. Again, the buffer indices are unsynchronized.

The problem exhibited in Prior Art FIG. 1 can be solved by reinitializing the LAN hardware and software buffer indices. However, the LAN packets already received would be lost and not get processed by the LAN software. On the other hand, continuing to let the buffer indices remain unsynchronized would be an inefficient use of processing power, since the processor would remain idle for a period, and then would have to catch up by processing all the queued buffers containing unprocessed data. Moreover, incoming data might not be stored if the LAN software is unable to clear buffer memory at a rate equal to the incoming data. This also would also result in lost data.

DISCLOSURE OF THE INVENTION

Various embodiments of the present invention describe a method and apparatus for synchronizing a software buffer index with an unknown hardware buffer index. Specifically, a method of processing data is disclosed comprising synchronizing a software buffer index to the unknown hardware buffer index. The method sequentially searches through a plurality of buffers containing data to find a second buffer with unprocessed data. The method is implemented when the software buffer index points to a first buffer containing processed data. Thereafter, the software buffer index is reset to a next available buffer having processed data following the second buffer.

BRIEF DESCRIPTION OF THE DRAWINGS

The above and other objects and advantages of the present invention will be more readily appreciated from the following detailed description when read in conjunction with the accompanying drawing, wherein.

PRIOR ART

Figure 1:
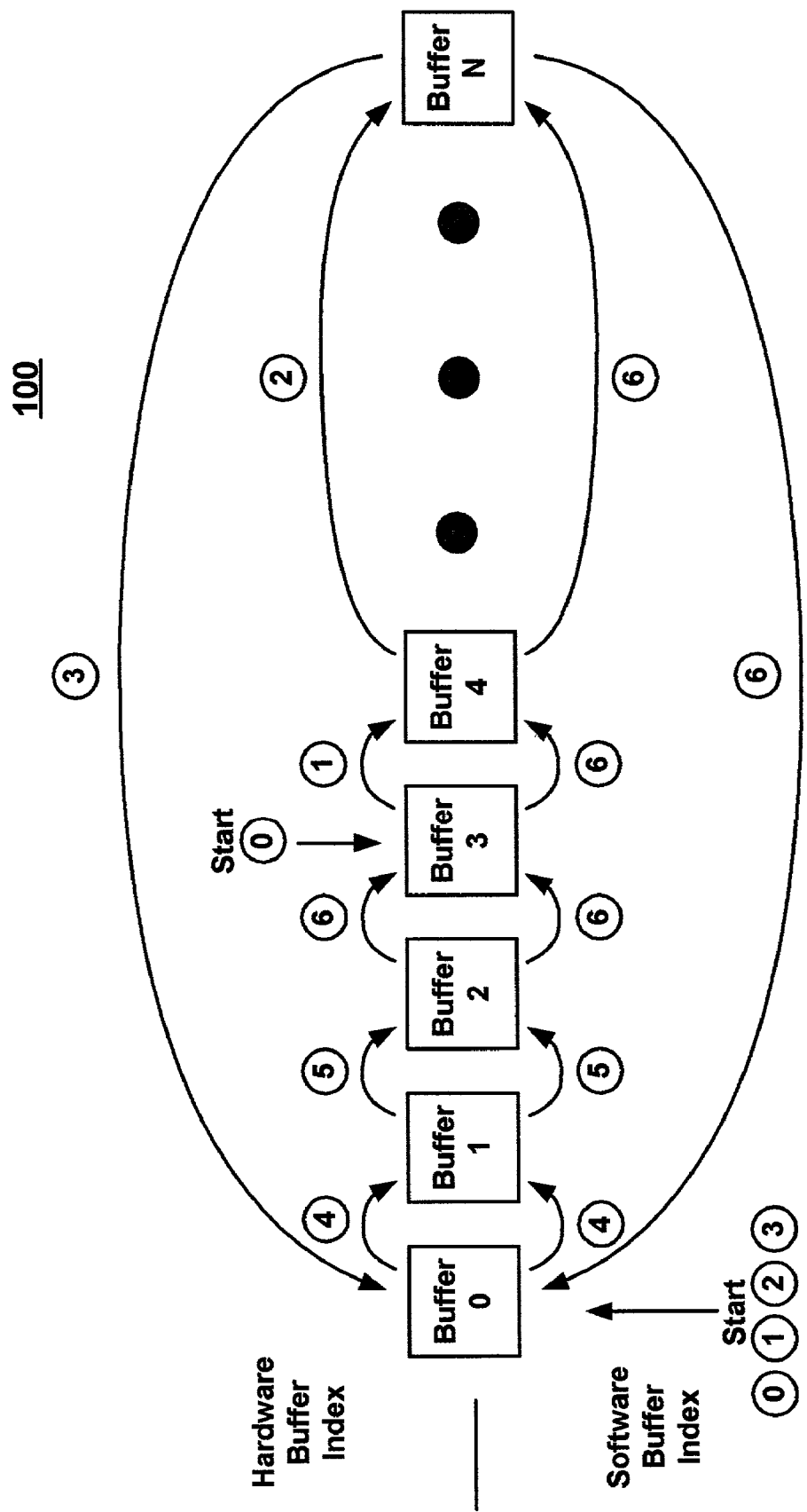
FIG. 1 is a diagram illustrating a ring of buffers for storing data having unsynchronized local area network (LAN) hardware and software buffer indices.

The drawings referred to in this description should be understood as not being drawn to scale except if specifically noted.

BEST MODES FOR CARRYING OUT THE INVENTION

Reference will now be made in detail to embodiments of the present invention, a method for synchronizing a local area network (LAN) software buffer index with an unknown LAN hardware buffer index, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "synchronizing," or "discovering," or "resetting," or "ignoring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Synchronizing LAN Software and Hardware Buffer Indices

Accordingly, the present invention provides a method and system for synchronizing a software buffer index with an unknown hardware buffer index. The present invention provides for efficient use of resources by processing incoming data as they are received by a hardware service processor.

Figure 2:
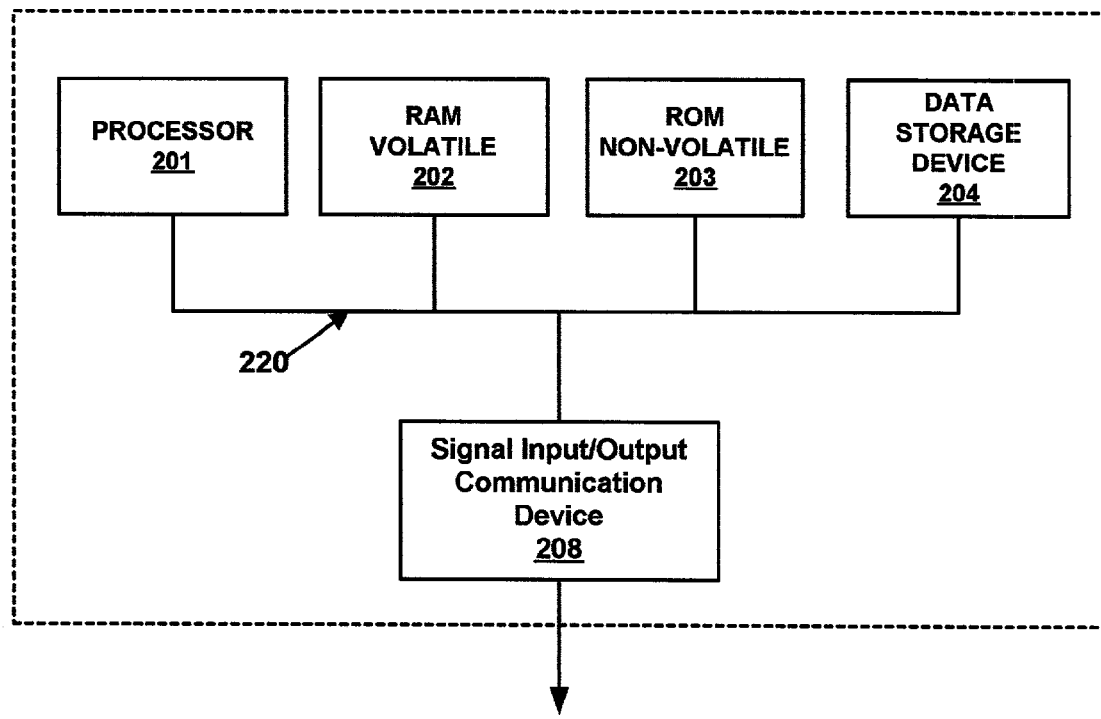
FIG. 2 is a logical block diagram of an exemplary LAN service processor that is capable of synchronizing LAN software and hardware buffer indices, in accordance with one embodiment of the present invention.

Referring to FIG. 2, embodiments of the present invention are comprised of computer-readable and computer-executable instructions which reside, for example, in computer-readable media of a computer system that is coupled to a LAN communication network. FIG. 2 is a block diagram of exemplary embedded components upon which embodiments of the present invention may be implemented. Exemplary computer system 200 includes an internal address/data bus 220 for communicating information, a central processor 201 coupled with the bus 220 for processing information and instructions, a volatile memory 202 (e.g., random access memory (RAM) static RAM, dynamic RAM, etc.) coupled with the bus 220 for storing information and instructions for the central processor 201, and a non-volatile memory 203 (e.g., read only memory (ROM), programmable ROM, flash memory, EPROM, EEPROM, etc.) coupled to the bus 220 for storing static information and instructions for the processor 201.

With reference still to FIG. 2, an optional signal Input/Output (I/O) device 208 is shown. The I/O device 208 is coupled to bus 220 for providing a communication link between the computer system 200 and other electronic devices, such as through a local area network (LAN). As such, signal I/O device 208 enables the central processor unit 201 to communicate with or monitor other electronic systems that are coupled to the computer system 200.

Embodiments of the present invention are discussed within the context of a LAN, LAN buffers, and LAN software and hardware buffer indices. However, it is appreciated that other embodiments of the present invention are well suited to buffers containing data in other communication networks, with other corresponding software and hardware buffer indices.

Figure 3:
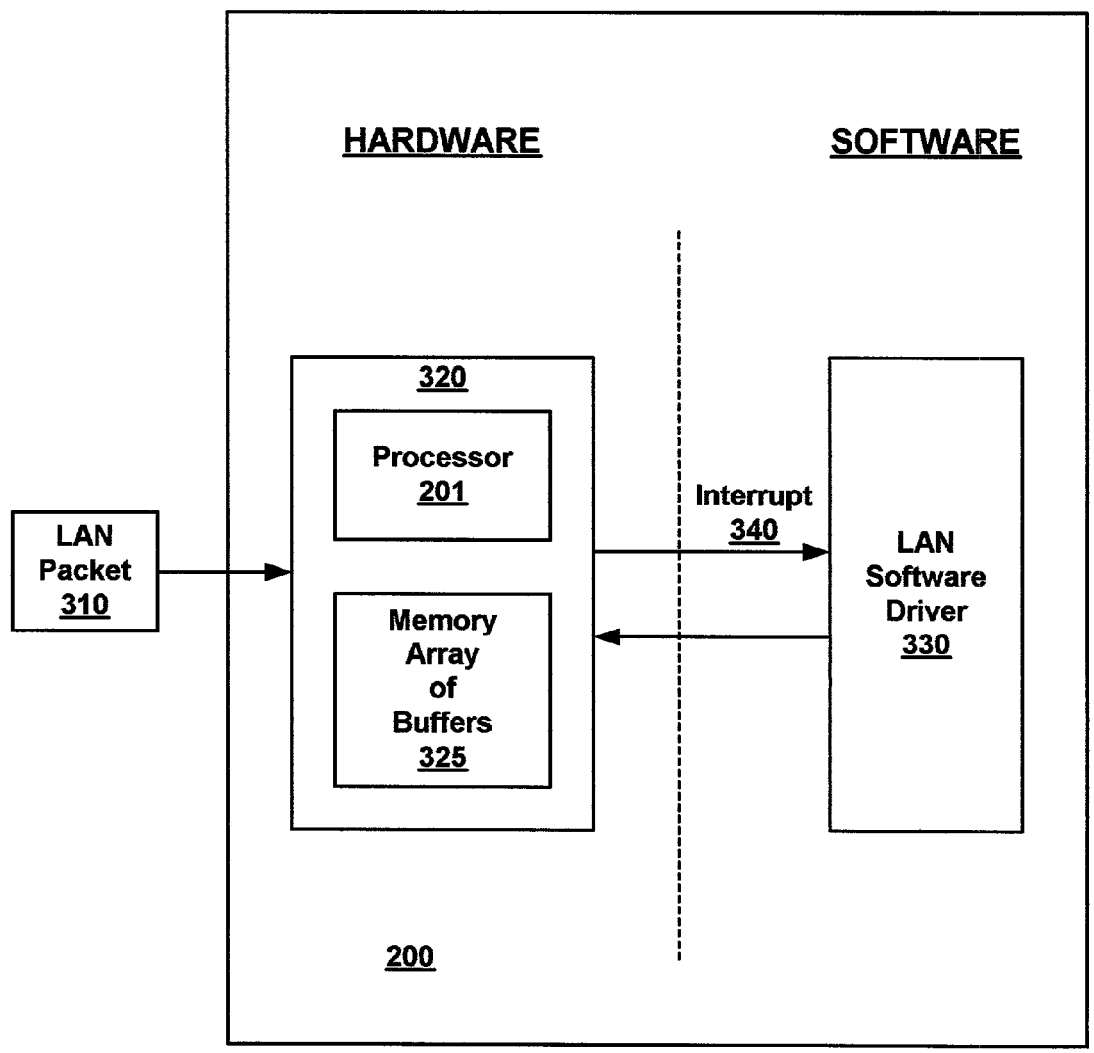
FIG. 3 is a data flow diagram illustrating the interfacing between a LAN hardware and LAN software driver, in accordance with one embodiment of the present invention.

Referring now to FIG. 3, a block diagram of the interface between a LAN hardware service processor 320 and a corresponding LAN software driver 330 is generally shown, in accordance with one embodiment of the present invention. The LAN hardware service processor 320 and the LAN software driver 330 can be located on computer system 200 of FIG. 2. The LAN hardware 320 is comprised partly of processor 201 and a memory array of buffers 325 that is directly accessible both by resources in the LAN hardware 320 and the LAN software driver 330.

The LAN hardware 320 manages access to the physical LAN network, in accordance with one embodiment. The corresponding LAN software driver 330 works in conjunction with the LAN hardware 320 to process the data stored in the memory array of buffers 325 by the LAN hardware 320.

Both the LAN hardware 320 and the LAN software driver 330 have respective buffer indices that indicates to which buffer in the memory array 325 the corresponding hardware or software will access. With normal data processing when the buffer indices are synchronized, the LAN software driver 330 would receive an interrupt signal 340 from the LAN hardware that a new LAN packet 310 of data was received and ready for processing. The LAN software driver 330 would check its buffer index and find the new data to process.

For example, a LAN packet 310 containing data is received by the LAN hardware 320. The LAN hardware 320 has sufficient processing resources 201 to store the LAN packet 310 in one of the buffers of the memory array 325. Embodiments of the present invention are well suited to any type of memory device for storing LAN packets, such as, a ring of buffers. After the LAN packet 310 is stored, an interrupt signal 340 is sent from the LAN hardware 320 to the LAN software driver 330 indicating that a LAN packet containing unprocessed data has been stored in the memory array 325. The LAN software driver 330 directly accesses the memory array 325 in order to process the data in the LAN packet 310.

In addition, when each of the LAN hardware and LAN software buffer indices reach the end of the memory array 325, the indices are moved to the beginning of the memory array 325 to continue storing, accessing, and processing data.

Figure 4:
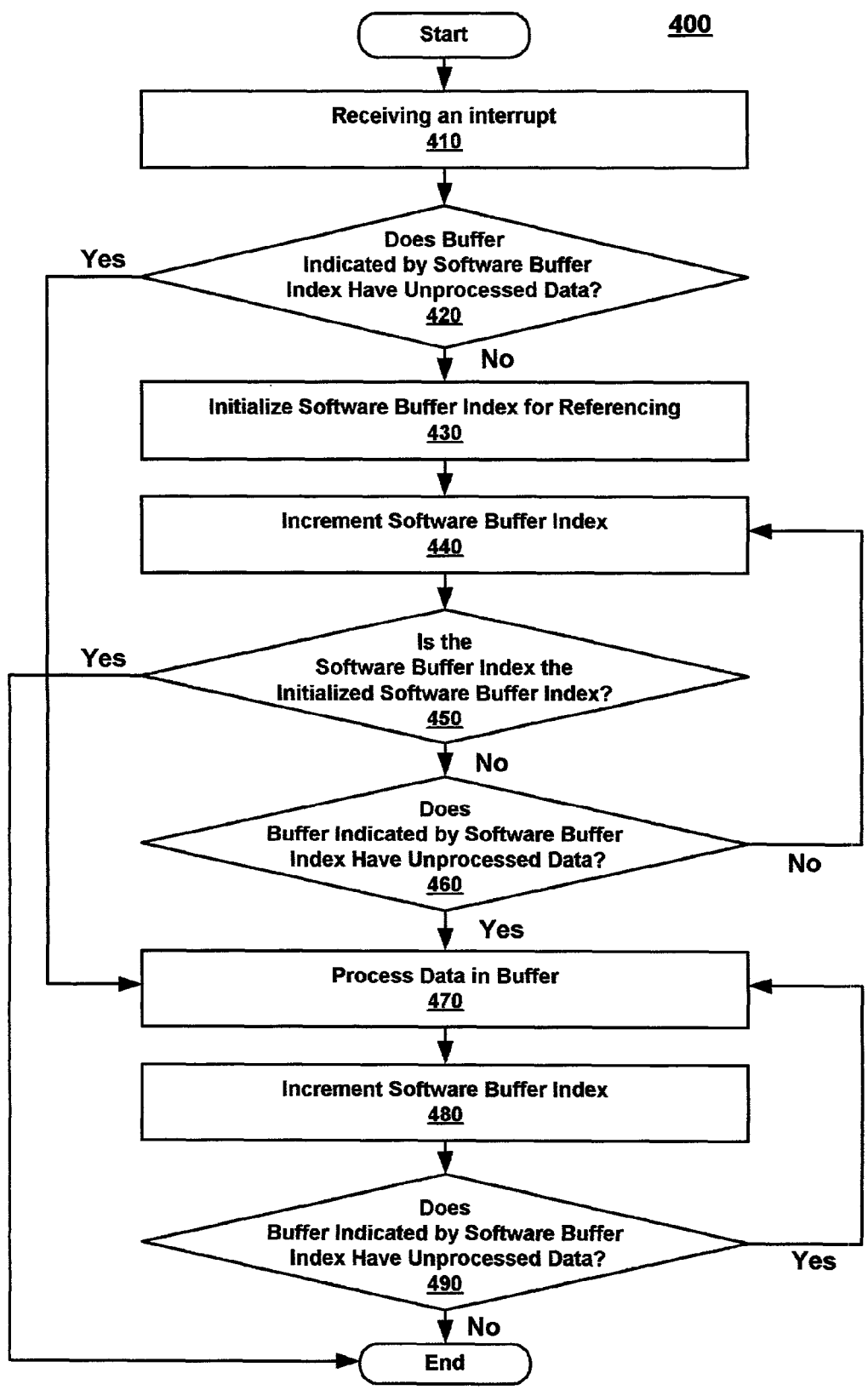
FIG. 4 is a flow diagram illustrating steps in a method for synchronizing LAN hardware and software buffer indices, in accordance with one embodiment of the present invention.
Figure 6:
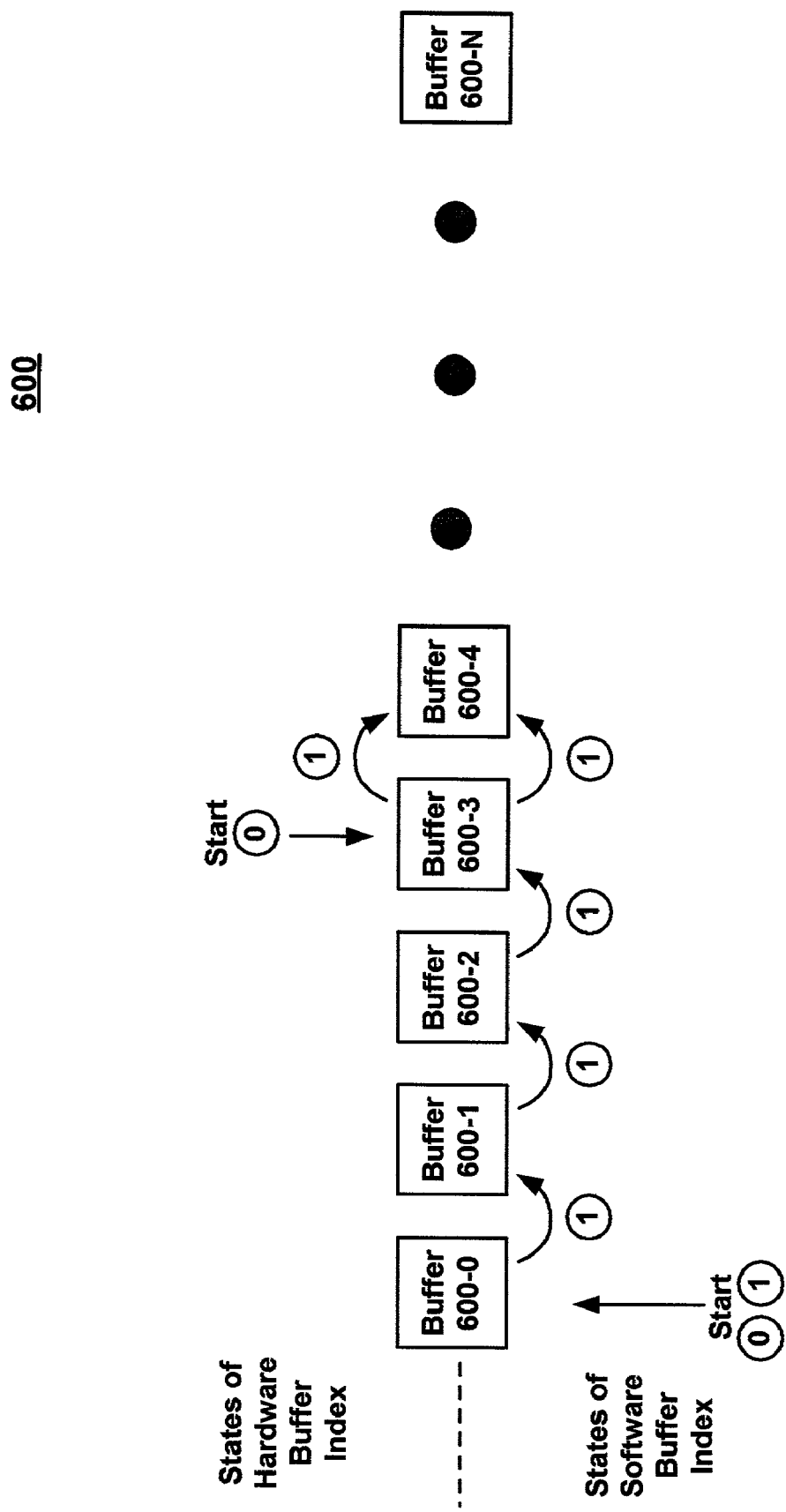
FIG. 6 is a diagram illustrating a ring of buffers for storing data and the various states of the LAN hardware and software buffer indices during synchronization, in accordance with one embodiment of the present invention.

FIG. 4 in combination with FIG. 6 illustrate the method of synchronizing LAN software and hardware buffer indices. FIG. 4 is a flow chart 400 illustrating steps in a method for synchronizing a LAN software buffer index with an unknown LAN hardware buffer index, in accordance with one embodiment of the present invention. In FIG. 4, if a LAN software finds that its current index points to a buffer which does not need processing, the LAN software implements the method outlined in FIG. 4 to realign its buffer index with the unknown LAN hardware buffer index. FIG. 6 is a flow diagram 600 illustrating the states of both the LAN software and hardware buffer indices as they become synchronized.

Returning now to FIG. 4, the present embodiment begins with the LAN software driver receiving an interrupt signal, in step 410. The interrupt indicates that the LAN hardware has received and stored new data needing processing, and in one embodiment is sent by the LAN hardware to the LAN software driver.

In condition step 420, the present embodiment checks the buffer indicated by the LAN software buffer index to see if the data in the buffer needs processing. If the data needs processing, the LAN software buffer index is synchronized with the LAN hardware buffer index and the present embodiment proceeds to step 470. On the other hand, if the data in the buffer has been previously processed, then the present embodiment proceeds to step 430.

In other embodiments, the buffers in the memory array of buffers are flagged to indicate whether the LAN hardware controls the buffer or the LAN software driver controls the buffer. If the LAN hardware controls the buffer, this indicates that the data contained within that buffer has been processed. Moreover, the LAN software cannot access data in buffers that are controlled by the LAN hardware. Similarly, if the LAN software controls the buffer, this indicates that the data contained within that buffer has not been processed. In this case, to prevent writing over unprocessed data, the LAN hardware cannot access data in buffers that are in the control of the LAN software.

As such, after the LAN hardware writes data into a particular buffer, the LAN hardware will pass control of that buffer over to the LAN software for processing. Similarly, after the LAN software processes data in a particular buffer, the LAN software passes control of that buffer over to the LAN hardware to store incoming data.

Correspondingly, in that embodiment, the condition steps 420, 460, and 490 would determine if the buffer indicated by the LAN software buffer index is controlled by the LAN software driver. This would indicate that the buffer contains unprocessed data. Otherwise, if the buffer indicated by the LAN software buffer index is controlled by the LAN hardware, this would indicate that the buffer contains processed data.

FIG. 6 illustrates by example a condition of the memory array of buffers when the LAN software and hardware buffer indices are unsynchronized. It is appreciated that the buffer indices can by unsynchronized in many conditions, each of which is capable of being synchronized using the process outlined in FIG. 4.

Diagram 600 illustrates a ring of N buffers for storing data, including buffers 600-0, 600-1, 600-2, 600-3, on up to 600-N. The upper portion of diagram 600 shows the flow of the LAN hardware buffer index in varying stages. The lower portion of diagram 600 shows the flow of the LAN software buffer index in the same varying stages. At stage 0, both the LAN hardware and software buffer indices are unsynchronized. The LAN hardware buffer index is pointed at buffer 600-3 and the LAN software buffer index is pointed at buffer 600-0. Buffers 600-0 and 600-3 contain processed data, or correspondingly are controlled by the LAN hardware.

With reference to diagram 600, returning to step 420, the present embodiment would determine that buffer 600-0 does not contain unprocessed data, or correspondingly, that buffer 600-0 is controlled by the LAN hardware.

In step 430, the present embodiment initializes the LAN software buffer index for referencing purposes. Essentially, the value of the initialized buffer index is stored for referencing, in one embodiment. This allows the LAN software driver to determine whether the interrupt truly indicates that new data has been received and stored into the memory array of buffers. In the situation presented in diagram 600, the initialized buffer index would point to buffer 600-0.

In step 440, the present embodiment starts to scan forward through the array of buffers in order to find the first buffer containing data that is ready to be processed, or correspondingly, a buffer that is controlled by the LAN software. In step 440, the present embodiment increments the software buffer index to point to the next buffer. Essentially, the software buffer index is incremented by one buffer. In the situation presented in diagram 600, in stage 1, the software buffer index would be incremented to point to buffer 600-1. Previously, in stage 1, the LAN hardware had received a LAN packet of data, stored the LAN packet into buffer 600-3, and advanced the hardware buffer index to point to buffer 600-4.

In condition step 450, the present embodiment determines whether the interrupt was spurious by determining if the software buffer index, now incremented is equal to the initialized software buffer index. If the LAN software buffer index is equal to the initialized software buffer index, the process in flow chart 400 has searched through all the buffers in the memory array and did not find any unprocessed data, or correspondingly any buffers in the control of the LAN software driver. In this case, the present embodiment in flow chart 400 ends.

On the other hand, if the present embodiment determines that the LAN software buffer index is not equal to the initialized software buffer index, then the present embodiment proceeds to condition step 460. In the situation presented in diagram 600, the LAN software buffer index is pointing to buffer 600-1 which is not the buffer pointed to by the initialized software buffer index, namely, buffer 600-0.

In condition step 460, the present embodiment determines if the buffer indicated by the software buffer index, now incremented, has unprocessed data, or correspondingly, is in the control of the LAN software driver. If the buffer contains processed data, then the present embodiment returns to step 440. In the situation presented in diagram 600, the buffer indicated by the software buffer index, buffer 600-1 has processed data. As such, the present embodiment, in stage 1, remains in this loop until reaching the software buffer index has been incremented to buffer 600-3.

In condition step 460, if the present embodiment determines that the buffer indicated by the software buffer index has unprocessed data, then the present embodiment proceeds to step 470 where the data is processed. In the situation presented in diagram 600, continuing with stage 1, the LAN software buffer index would incrementally be increased until it points to buffer 600-3. At that point, the present embodiment processes the data located in buffer 600-3. From this point on, the software buffer index and the hardware buffer index are synchronized. Essentially, the software buffer index is reset to match the buffer indicated by the hardware buffer index.

In step 480, the present embodiment increments the software buffer index to point to the next buffer. Essentially, the software buffer index is incremented by one buffer. In the situation presented in diagram 600, the software buffer index would be incremented to point to buffer 600-4. Incrementing to buffer 600-4 is still associated with stage 1 in the diagram 600.

In condition step 490, the present embodiment determines if the buffer indicated by the software buffer index has unprocessed data, or correspondingly, is in the control of the LAN software driver. If the buffer contains unprocessed data, the present embodiment proceeds back to step 470. This loop guarantees that data in successive buffers will be processed if one interrupt signal is representative of data contained within successive buffers.

Otherwise, in step 490, if the present embodiment determines that the buffer contains processed data, or correspondingly, is in the control of the LAN hardware, then the process in flow chart 400 ends with the software buffer index synchronized to the unknown hardware buffer index. In the situation presented in diagram 600, the software buffer index would be synchronized to the hardware buffer index, and both would point to buffer 600-4.

Figure 5:
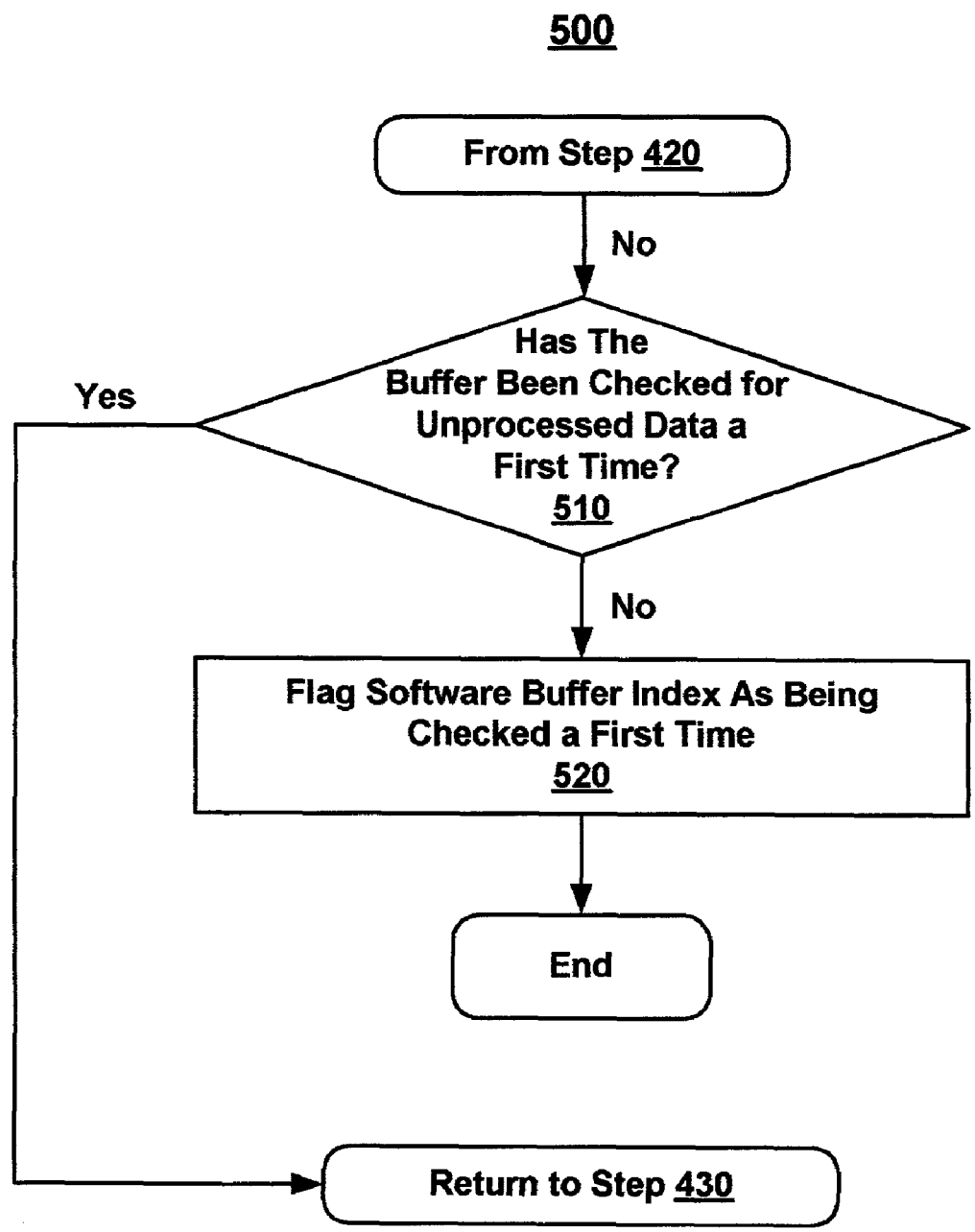
FIG. 5 is a flow illustrating steps in a method for avoiding spurious interrupts in a method for synchronizing LAN hardware and software buffer indices, in accordance with one embodiment of the present invention.

FIG. 5 is a flow chart 500 illustrating steps in a method for avoiding spurious interrupts when synchronizing a LAN software buffer index to an unknown LAN hardware buffer index, in accordance with one embodiment of the present invention. Occasionally, an interrupt could occur without data being placed into a buffer, or correspondingly changing control of a buffer to the LAN software driver. To allow for this, the first time the interrupt occurs for a given software buffer index that points to a buffer containing processed data, the interrupt signal is ignored. The process in flow chart 500 is optional.

From step 420 in flow chart 400, the present embodiment determines if the buffer indicated by the software buffer index been checked previously for unprocessed data in condition step 510. If the present embodiment determines that the buffer has been previously checked a first time for unprocessed data, then the process in flow chart 500 returns to step 430 in flow chart 400.

On the other hand, if the present embodiment determines that the buffer has not been previously checked for unprocessed data, then the process in flow chart 500 proceeds to step 520. In step 520, the present embodiment flags the buffer indicated by the software buffer index as being checked for unprocessed data for a first time. Thereafter, the process outlined in flow chart 500 ends. Essentially, to avoid spurious interrupts, a first interrupt is ignored.

Below is a listing of pseudo code that can be used in one embodiment of the present invention for synchronizing a LAN software buffer index to an unknown LAN hardware buffer index, in accordance with one embodiment of the present invention. It is appreciated that the listed pseudo code is exemplary only and that other alternatives are available. The example should not be construed as limiting the scope of the invention to any particular computer language or subroutine architecture or structure.

EXAMPLE PSEUDO CODE

```
int rBdrIndex;
lan__rbd* pTestRbd;
static int oldRbdrIndex;
PDrvCtrl->flags.rxHandling = TRUE;
if (spLanGetRBD(pDrvCtrl) = = NULL)    /* Interrupt, but no buffer */
{
    if (pDrvCtrl->rbdrIndex = = old RbdrIndex
                                       /* Problem twice - now act */
    {
        /* Find first to operate on */
        rBdrIndex = pDrvCtrl->RbdrIndex;
                                       /* Initial index */
        do
        {
            /* Increment index */
            rBdrIndex = (rBdrIndex +1) & (pDrvCtrl->RbdrSize -1);
            /* Get next buffer descriptor */
            pTestRbd = pDrvCtrl->pRbdr + rBdrIndex;
        } while (   (rBdrIndex != pDrvCtrl->RbdrIndex) &&
                    ( (pTestRbd->stat &RBD__OWN) !=0) );
        if (rBdrIndex != pDrvCtrl->RbdrIndex)
                                       /* Found one needing attn. */
        {
            pDrvCtrl->RbdrIndex = rBdrIndex;
                                       /* Reset index */
        }
    }
    else
    {
        /* Wait one interrupt to see if it clears itself */
        oldRbdrIndex = pDrvCtrl->RbdrIndex;
    } /* if (pDrvCtrl->RbdrIndex = =oldRbdrIndex) */
} /* if (spLanGetRBD(pDrvCtrl) = =NULL) */
do { /* get new buffer to process */
    ...
```

While the methods of embodiments illustrated in flow charts 400 and 500 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method and apparatus for synchronizing a LAN software buffer index to an unknown LAN hardware software index, is thus described. While the present invention has been described in particular embodiments, it should be appreciated that the present invention should not be construed as limited by such embodiments, but rather construed according to the below claims.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A method of processing data comprising:
    when a software buffer index points to a first buffer containing processed data, synchronizing said software buffer index to a hardware buffer index by sequentially searching through a plurality of buffers containing data to determine whether there is a second buffer with unprocessed data; and
    if there is said second buffer with unprocessed data, resetting said software buffer index to a next available buffer having processed data following said second buffer, and otherwise stopping said searching when each buffer of said plurality of buffers has been searched and a buffer with unprocessed data is not found.

2. The method of processing data as described in claim 1, wherein said synchronizing further comprises:
    synchronizing said hardware buffer index and said software buffer index in response to an interrupt indicating data has been stored in one of said plurality of buffers and is ready for processing.

3. The method of processing data as described in claim 1, wherein said synchronizing further comprises:
    ignoring a first interrupt indicating data has been stored in one of said plurality of buffers and is ready for processing when said software buffer index points to said first buffer containing processed data; and
    synchronizing said hardware buffer index and said software buffer index in response to a second interrupt indicating data has been stored in one of said plurality of buffers and is ready for processing when said software buffer index points to said first buffer containing processed data for a second time.

4. The method of processing data as described in claim 1, further comprising:
    determining if said first buffer contains processed data; and
    processing data in said first buffer if said data is unprocessed.

5. The method of processing data as described in claim 1, wherein said synchronizing further comprises:
    wrapping around to a start buffer after searching the end buffer in said plurality of buffers when sequentially searching through said plurality of buffers, said plurality of buffers sequentially beginning with a start buffer and ending with an end buffer.

6. The method of processing data as described in claim 1, further comprising:
    when said software buffer index points to said first buffer containing processed data, using a value of said software buffer index corresponding to said first buffer as a reference value;
    incrementing said software buffer index as each buffer of said plurality of buffers is searched, wherein when said software buffer index reaches one end of a range of possible values it is reset to the other end of said range; and
    stopping said searching when said software buffer index reaches said reference value without finding a buffer in said plurality of buffers with unprocessed data.

7. The method of processing data as described in claim 1, wherein each of said plurality of buffers is a local area network (LAN) buffer for storing LAN packets of data.

8. The method of processing data as described in claim 7, wherein said software buffer index is a LAN software buffer index, and said hardware buffer index is a LAN hardware buffer index.

9. The method of processing data as described in claim 1, further comprising:
    processing said unprocessed data in said second buffer.

10. A method of processing data comprising:
    receiving an interrupt indicating data from a local area network (LAN) has been stored in one of a plurality of buffers and is ready for processing;
    when a software buffer index points to a first buffer containing processed data, sequentially searching through said plurality of buffers containing data to determine whether there is a second buffer with unprocessed data; and if there is said second buffer with unprocessed data, synchronizing said software buffer index to a hardware buffer index by resetting said software buffer index to a next available buffer having processed data following said second buffer, and otherwise stopping said searching when each buffer of said plurality of buffers has been searched and a buffer with unprocessed data is not found.

11. The method of processing data as described in claim 10, wherein said data from said LAN is a LAN packet.

12. The method of processing data as described in claim 10, wherein a LAN driver performs said receiving, said searching and said synchronizing.

13. The method of processing data as described in claim 10, further comprising:

determining if said first buffer contains processed data; and processing data in said first buffer if said data is unprocessed.

14. The method of processing data as described in claim 10, further comprising:

when said software buffer index points to said first buffer containing processed data, using a value of said software buffer index corresponding to said first buffer as a reference value;

incrementing said software buffer index as each buffer of said plurality of buffers is searched, wherein when said software buffer index reaches one end of a range of possible values it is reset to the other end of said range; and stopping said searching when said software buffer index reaches said reference value without finding a buffer in said plurality of buffers with unprocessed data.

15. The method of processing data as described in claim 10, further comprising:

processing said unprocessed data in said second buffer.

16. A computer system comprising:

a processor; and a computer readable memory coupled to said processor and containing program instructions that, when executed, implement a method of processing data, comprising:

when a software buffer index points to a first buffer containing processed data, synchronizing said software buffer index to a hardware buffer index by sequentially searching through a plurality of buffers containing data to determine whether there is a second buffer with unprocessed data; and if there is said second buffer with unprocessed data, resetting said software buffer index to a next available buffer having processed data following said second buffer, and otherwise stopping said searching when each buffer of said plurality of buffers has been searched and a buffer with unprocessed data is not found.

17. The computer system as described in claim 16, wherein said synchronizing further comprises:

synchronizing said hardware buffer index and said software buffer index in response to an interrupt indicating data has been stored in one of said plurality of buffers and is ready for processing.

18. The computer system as described in claim 16, wherein said synchronizing further comprises:

ignoring a first interrupt indicating data has been stored in one of said plurality of buffers and is ready for processing when said software buffer index points to said first buffer containing processed data; and synchronizing said hardware buffer index and said software buffer index in response to a second interrupt indicating data has been stored in one of said plurality of buffers and is ready for processing when said software buffer index points to said first buffer containing processed data for a second time.

19. The computer system as described in claim 16, wherein said method further comprises:

determining if said first buffer contains processed data; and processing data in said first buffer if said data is unprocessed.

20. The computer system as described in claim 16, wherein said synchronizing further comprises:

wrapping around to a start buffer after searching the end buffer in said plurality of buffers when sequentially searching through said plurality of buffers, said plurality of buffers sequentially beginning with a start buffer and ending with an end buffer.

21. The computer system as described in claim 16, wherein said method further comprises:

when said software buffer index points to said first buffer containing processed data, using a value of said software buffer index corresponding to said first buffer as a reference value;

incrementing said software buffer index as each buffer of said plurality of buffers is searched, wherein when said software buffer index reaches one end of a range of possible values it is reset to the other end of said range; and stopping said searching when said software buffer index reaches said reference value without finding a buffer in said plurality of buffers with unprocessed data.

22. The computer system as described in claim 16, wherein each of said plurality of buffers is a local area network (LAN) buffer for storing LAN packets of data.

23. The computer system as described in claim 22, wherein said software buffer index is a LAN software buffer index, and said hardware buffer index is a LAN hardware buffer index.

24. The computer system as described in claim 16, wherein said method further comprises:

processing said unprocessed data in said second buffer.

* * * * *